(12) United States Patent
Liu et al.

(10) Patent No.: US 11,438,847 B2
(45) Date of Patent: Sep. 6, 2022

(54) POWER CONTROL METHOD AND APPARATUS

(71) Applicant: Huawei Technologies Co., Ltd., Guangdong (CN)

(72) Inventors: Fengwei Liu, Chengdu (CN); Shitong Yuan, Chengdu (CN); Lei Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/170,108

(22) Filed: Feb. 8, 2021

(65) Prior Publication Data

US 2021/0168728 A1 Jun. 3, 2021

Related U.S. Application Data

(63) Continuation of application No. PCT/CN2019/100065, filed on Aug. 9, 2019.

(30) Foreign Application Priority Data

Aug. 10, 2018 (CN) .......................... 201810912271.2

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0048* (2013.01); *H04W 52/242* (2013.01); *H04W 72/042* (2013.01)

(58) Field of Classification Search
CPC .......................... H04L 5/0048; H04W 52/242; H04W 52/146; H04W 52/54; H04W 52/46; H04W 72/042
(Continued)

(56) References Cited

U.S. PATENT DOCUMENTS 9,674,886 B2 * 6/2017 Yang ..................... H04W 24/08
2017/0331577 A1 11/2017 Parkvall et al.
(Continued)

FOREIGN PATENT DOCUMENTS

CN 102378387 A 3/2012
CN 102457952 A 5/2012
(Continued)

OTHER PUBLICATIONS

Omer Bulakci et al: "Joint optimization of uplink power control parameters in LTE-Advanced relay networks", Jul. 4, 2011, pp. 2064-2069, XP031925924.
(Continued)

*Primary Examiner* — John J Lee
(74) *Attorney, Agent, or Firm* — Womble Bond Dickinson (US) LLP (57) ABSTRACT

This application provides a power control method including: receiving, by a second node, radio resource control (RRC) from a first node, where the RRC includes a power control parameter set configured for the second node, the power control parameter set includes a power control index, and the power control index is determined based on a transmission mode or a transmission capability of the second node; receiving downlink control information (DCI) including power control index indication information used to: when the first node schedules the second node, indicate a value of a power control index that is for uplink transmission and that is for the second node; determining a transmit power based on the power control index indication information and the power control parameter set; and sending a signal at the determined transmit power.

12 Claims, 6 Drawing Sheets

(51) Int. Cl.
*H04W 52/24* (2009.01)
*H04W 72/04* (2009.01)

(58) Field of Classification Search
USPC .................. 455/522, 69, 422.1, 67.11, 452.1
See application file for complete search history.

(56) References Cited

U.S. PATENT DOCUMENTS

| | | | |
|---|---|---|---|
| 2018/0146434 A1* | 5/2018 | Eriksson | H04W 52/146 |
| 2019/0124598 A1* | 4/2019 | Fakoorian | H04L 5/005 |
| 2019/0174466 A1* | 6/2019 | Zhang | H04L 5/005 |

FOREIGN PATENT DOCUMENTS

| | | | |
|---|---|---|---|
| CN | 102892186 A | 1/2013 | |
| CN | 103814616 A | 5/2014 | |
| CN | 107889209 A | 4/2018 | |
| CN | 108366418 A | 8/2018 | |
| CN | 105432105 B | 4/2019 | |
| EP | 3550894 A1 | 10/2019 | |
| EP | 3554151 A1 | 10/2019 | |
| WO | 2010082877 A1 | 7/2010 | |
| WO | 2013165286 A1 | 11/2013 | |
| WO | 2018107520 A1 | 6/2018 | |

OTHER PUBLICATIONS

LG Electronics: "Discussions on NR IAB support", 3GPP Draft; R1-1804583,Apr. 7, 2018, XP051414004, total 9 pages.

* cited by examiner

POWER CONTROL METHOD AND APPARATUS

CROSS-REFERENCE TO RELATED APPLICATIONS

This application is a continuation of International Application No. PCT/CN2019/100065, filed on Aug. 9, 2019, which claims priority to Chinese Patent Application No. 201810912271.2, filed on Aug. 10, 2018, the disclosures of which are incorporated herein by reference in their entireties.

TECHNICAL FIELD

This application relates to the communications field, and more specifically, to a power control method and apparatus.

BACKGROUND

In a fifth generation communications system (5th generation mobile networks or 5th generation wireless systems, 5G), an integrated access and backhaul (IAB) node is an evolved node of a relay technology. In a wireless communications network, a relay node is usually configured to implement extended coverage or implement coverage for a coverage hole, or to improve a system capacity. The IAB node is functionally divided into: an IAB mobile termination (MT) and an IAB base station distributed unit (DU). The IAB MT indicates that the IAB node serves as a terminal device UE and is connected to an upstream node. The IAB DU means that the IAB node serves as a base station distributed unit that provides access services for UE and another downstream node.

When the IAB node accesses a network, a link through which the IAB DU provides a service to the UE is referred to as an access link (AC), and a link through which data is sent to another IAB node is referred to as a backhaul link (BH). If a transmit power calculation procedure in the conventional technology is used, transmit powers of the access link and the backhaul link of the IAB node are unbalanced, which greatly affects the links. Therefore, how to perform power control on the IAB node is a problem that needs to be considered in current IAB standardization.

SUMMARY

In view of this, this application provides a power control method and apparatus. A value of a power control index is determined based on a transmission mode and/or a transmission capability, to meet more application scenarios and support more transmission modes. For example, a node supports at least two transmit beams, and power control parameters can be adjusted more flexibly and quickly in space division multiplexing, non-space division multiplexing, and other scenarios.

According to a first aspect, a power control method includes:

A second node receives radio resource control RRC from a first node. The RRC includes a power control parameter set configured for the second node. The power control parameter set includes a power control index, and the power control index is determined based on a transmission mode and/or a transmission capability of the second node. The second node receives downlink control information DCI. The DCI includes power control index indication information. The power control index indication information is used to indicate, when the first node schedules the second node, a value of a power control index for uplink transmission that is configured for the second node. The second node determines a transmit power based on the power control index indication information and the power control parameter set. The second node sends a signal with the determined transmit power.

According to the foregoing embodiment, when power control is considered to be performed on a node, a value of a power control index is determined based on a transmission mode and/or a transmission capability, so that more application scenarios can be met and more transmission modes can be supported, for example, the node supports at least two transmit beams, and power control parameters can be adjusted more flexibly and quickly in space division multiplexing, non-space division multiplexing, and other scenarios.

In an embodiment, the transmission mode of the second node is a space division multiplexing transmission mode, and the transmission capability of the second node is a quantity of beams supported by the second node.

In an embodiment, the method further includes: Different transmission modes correspond to different power control indexes, and different transmission capabilities correspond to different power control indexes.

In an embodiment, the power control parameter set further includes at least one of the following power control parameters:

an uplink power control identifier, an uplink reference signal path loss identifier, an uplink transmission reference power, a power control parameter, or a path loss compensation factor.

In an embodiment, the power control index is associated with the power control parameter.

In an embodiment, that the second node determines a transmit power based on the power control index indication information and the power control parameter set includes:

The second node obtains, based on the power control index indication information, the power control index indicated by the power control index indication information.

The second node obtains, based on the obtained power control index and the power control parameter set, a power control parameter corresponding to the power control index.

The second node determines the transmit power based on the power control parameter and according to a power control calculation formula.

According to a second aspect, a power control method includes:

sending a reference signal;

receiving transmit power dynamic range, where transmit power dynamic range is determined based on the reference signal;

determining a transmit power based on transmit power dynamic range; and sending a signal with the determined transmit power.

In the solution of this embodiment, a relay node performs measurement, then feeds back uplink power dynamic range, and determines an uplink transmit power, so that the transmit power can be properly controlled when the relay node sends data through space division, thereby reducing interference impact on another link.

In an embodiment, transmit power dynamic range includes power spectral density PSD dynamic range and/or energy per resource element EPRE dynamic range.

In an embodiment, the determining a transmit power based on transmit power dynamic range includes:

adjusting the transmit power based on transmit power dynamic range and a preconfigured transmit power.

According to a third aspect, a power control apparatus includes:

a transceiver, configured to: receive radio resource control RRC, where the RRC includes a power control parameter set of the power control apparatus, the power control parameter set includes a power control index, and the power control index is determined based on a transmission mode and/or a transmission capability of the power control apparatus; and receive downlink control information DCI, where the DCI includes power control index indication information, and the power control index indication information is used to indicate a configured value of a power control index for uplink transmission; and a processor, configured to determine a transmit power based on the power control index indication information and the power control parameter set.

According to a fourth aspect, a power control apparatus includes:

a transceiver, configured to send a reference signal and receive transmit power dynamic range, where transmit power dynamic range is determined based on the reference signal; and send a signal with a determined transmit power; and a processor, configured to determine the transmit power based on transmit power dynamic range.

According to a fifth aspect, a power control apparatus includes:

a memory, configured to store a program; and a processor, configured to execute the program stored in the memory, where when the program is executed, the processor is configured to perform the method according to any one of the first aspect or the second aspect and the possible implementations of the first aspect or the second aspect.

According to a sixth aspect, a power control apparatus includes:

a computer-readable storage medium, including an instruction, where when the instruction is run on a computer, the computer is enabled to perform the method according to any one of the first aspect or the second aspect and the possible implementations of the first aspect or the second aspect.

According to a seventh aspect, a power control apparatus includes a computer program product, where the computer program product includes computer program code, and when the computer program code is run on a computer, the computer is enabled to perform the method according to either of the first aspect or the second aspect.

According to an eighth aspect, a chip includes a memory and a processor. The memory is configured to store a computer program. The processor is configured to invoke the computer program from the memory and run the computer program, so that the processor performs the method according to either of the first aspect or the second aspect.

DESCRIPTION OF EMBODIMENTS

The following describes technical solutions of this application with reference to the accompanying drawings.

Figure 1:
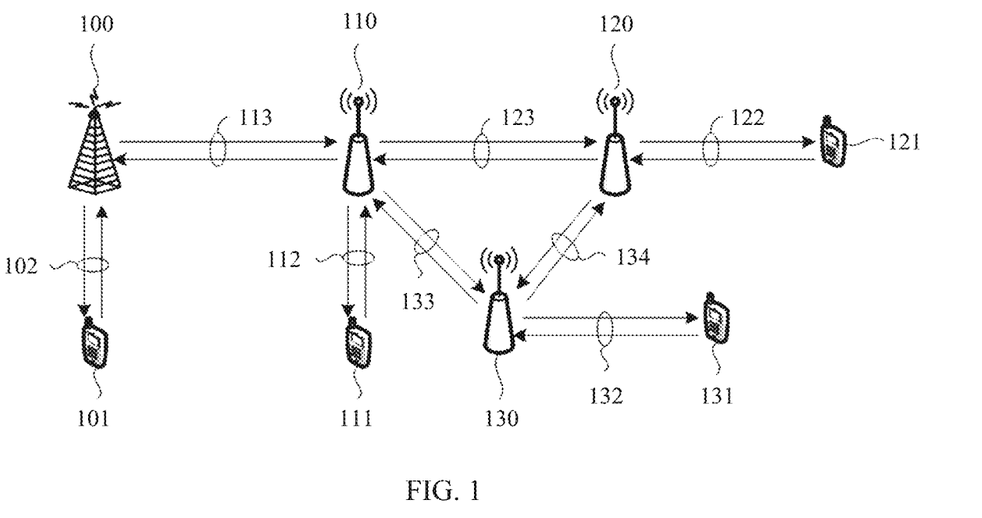
FIG. 1 is an architectural diagram of a system to which an embodiment is applied.

FIG. 1 is a schematic diagram of a communications system according to an embodiment. As shown in FIG. 1, the communications system includes a network device and at least one terminal device. The terminal device is within coverage of the network device and communicates with the network device, to implement the technical solutions provided in the following embodiments of this application. The communications system in this embodiment may be used in a multi-TRP scenario.

Embodiments of this application are described with reference to the network device and the terminal device. The network device and the terminal device may work on a licensed frequency band or an unlicensed frequency band.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device, a terminal device in a next generation communications system, for example, the fifth-generation (5G) communications network, a terminal device in a future evolved public land mobile network (PLMN), a terminal device in an NR system, or the like.

By way of example and not limitation, in this embodiment of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. Generalized wearable intelligent devices include full-featured and large-sized devices that can implement complete or partial functions without depending on smartphones, such as smartwatches or smart glasses, and devices that focus on only one type of application and need to work with other devices such as smartphones, such as various smart bands or smart jewelries for vital sign monitoring.

In addition, the network device is also referred to as a radio access network (RAN) device, is a device that connects a terminal device to a wireless network, and may be an evolved NodeB (eNB, or eNodeB) in long term evolution (LTE), a relay node or an access point, a network device in a 5G network, a network device in a future evolved PLMN network, a next generation NodeB (gNodeB) in an NR system, or the like. This is not limited herein.

In addition, in this embodiment of this application, the network device provides a service to a cell, and the terminal device communicates with the network device by using a transmission resource (for example, a frequency domain resource or a spectrum resource) used by the cell. The cell may be a cell corresponding to a network device (for example, a base station), and the cell may belong to a macro base station, or may belong to a base station corresponding to a small cell. The small cell herein may include a metro cell, a micro cell, a pico cell, a femto cell, and the like. These small cells have features of a small coverage area and a low transmit power, and are suitable for providing high-speed data transmission services.

FIG. 1 is a schematic structural diagram of the communications system to which this embodiment is applicable.

It should be noted that the communications system mentioned in this embodiment of this application includes but is not limited to a narrowband internet of things (NB-IoT) system, a long term evolution (LTE) system, a next-generation 5G mobile communications system, a post-5G communications system, or a device to device (D2D) communication system.

In the communications system shown in FIG. 1, an integrated access and backhaul IAB system is provided. One IAB system includes at least one base station 100, one or more terminals 101 served by the base station 100, one or more relay nodes rTRPs 110, and one or more terminals 111 served by the rTRP 110. Usually, the base station 100 is referred to as a donor gNodeB (DgNB), and the rTRP 110 is connected to the base station 100 through a wireless backhaul link 113. In this application, the terminal is also referred to as a terminal, and the donor gNodeB is also referred to as a donor node, that is, a donor node. The base station includes but is not limited to an evolved NodeB (eNB), a radio network controller (RNC), a NodeB (NB), a base station controller (BSC), a base transceiver station (BTS), a home NodeB (for example, a home evolved nodeB, or a home node B, HNB), a baseband unit (BBU), a next-generation new radio base station (for example, a gNB), or the like.

The integrated access and backhaul system may further include a plurality of other relay nodes, such as an rTRP 120 and an rTRP 130. The rTRP 120 is connected to the relay node rTRP 110 through a wireless backhaul link 123 to access a network. The rTRP 130 is connected to the relay node rTRP 110 through a wireless backhaul link 133 to access the network. The rTRP 120 serves one or more terminals 121. The rTRP 130 serves one or more terminals 131. In FIG. 1, the relay nodes rTRP 110 and rTRP 120 are both connected to the network through a wireless backhaul link. In this application, the wireless backhaul links are all viewed from a perspective of the relay node. For example, the wireless backhaul link 113 is a backhaul link of the relay node rTRP 110, and the wireless backhaul link 123 is a backhaul link of the relay node rTRP 120. As shown in FIG. 1, a relay node, such as the relay node 120, may be connected to another relay node 110 through a wireless backhaul link, such as the wireless backhaul link 123, to be connected to the network. In addition, the relay node may be connected to the network by using a plurality of wireless relay nodes.

Usually, a node that provides a wireless backhaul link resource, for example, the relay node 110, is referred to as an upstream node of the relay node 120, and the relay node 120 is referred to as a downstream node of the relay node 110. Usually, a downstream node can be considered as a terminal of an upstream node. It should be understood that, in the integrated access and backhaul system shown in FIG. 1, one relay node is connected to one upstream node. However, in a future relay system, to improve reliability of a wireless backhaul link, one relay node, for example, the relay node 120, may be served by a plurality upstream nodes at the same time. For example, the rTRP 130 in the figure may also be connected to the relay node rTRP 120 through the backhaul link 134, that is, both the rTRP 110 and the rTRP 120 are upstream nodes of the rTRP 130. In this application, the terminals 101, 111, 121, and 131 may be stationary or mobile devices. For example, the mobile device may be a mobile phone, an intelligent terminal, a tablet computer, a notebook computer, a video game console, a multimedia player, or even a mobile relay node or the like. The stationary device is usually located in a fixed location, such as a computer or an access point (connected to the network through a radio link, such as a stationary relay node). Names of the relay nodes rTRPs 110, 120, and 130 are not limited to a deployment scenario or network thereof, and may be any other name, such as a relay or an RN. The use of the rTRP in this application is merely a requirement for ease of description.

In FIG. 1, the radio links 102, 112, 122, 132, 113, 123, 133, and 134 may be bidirectional links, including uplink and downlink transmission links. In particular, the radio backhaul links 113, 123, 133, and 134 may be used by an upstream node to provide a service to a downstream node, for example, the upstream node 100 provides a wireless backhaul service to the downstream node 110. It should be understood that the uplink and the downlink of the backhaul link may be separated, that is, transmission on the uplink and the downlink is not performed by using a same node. The downlink transmission means that an upstream node such as the node 100 transmits information or data to a downstream node such as the node 110. The uplink transmission means that a downstream node such as the node 110 transmits information or data to an upstream node such as the node 100. The node is not limited to a network node or a terminal. For example, in a D2D scenario, the terminal may serve as a relay node to serve another terminal. The wireless backhaul link may also be an access link in some scenarios. For example, the backhaul link 123 may also be considered as an access link for the node 110, and the backhaul link 113 is also an access link for the node 100. It should be understood that the upstream node may be a base station or a relay node, and the downstream node may be a relay node, or may be a terminal with a relay function. For example, in a D2D scenario, the downstream node may also be a terminal.

In FIG. 1, a donor node is a node that can be used to access a core network, or an anchor base station of a radio access network that can be used to access the network. The anchor base station is responsible for data processing at a packet data convergence protocol (PDCP) layer, or is responsible for receiving data from a core network and forwarding the data to a relay node, or receiving data from a relay node and forwarding the data to a core network.

For ease of description, the relay node is referred to as a first node below, and an upstream node of the first node is referred to as a second node. The first node and the second node each may be a base station, a relay node, a terminal with a relay function, or any device with a relay function.

When the relay node is under a half-duplex constraint, spectrum resources of a wireless backhaul link and an access link of an in-band relay overlap, that is, the backhaul link of the in-band relay and the access link of the in-band relay have a same frequency band. For example, when performing receiving on a downlink wireless backhaul link of the base station, the rTRP cannot perform transmission to a subordinate terminal or device. When performing uplink transmission to an upstream node on a backhaul link, the rTRP cannot receive transmission from a subordinate terminal or device on an uplink access link or a backhaul link of a downstream node. It should be understood that the half-duplex constraint of the in-band relay is a half-duplex constraint of co-frequency co-time sending and receiving, and is irrelevant to a time division duplexing (TDD) or a frequency division duplexing (FDD) manner used by the system.

Some common technical terms are defined as follows:

An access link is a radio link used by a node to communicate with a downstream node of the node, and includes uplink and downlink transmission links. Uplink transmission on the access link is also referred to as uplink transmission of the access link, and downlink transmission on the access link is also referred to as downlink transmission of the access link. The nodes include but are not limited to the foregoing IAB node.

A backhaul link is a radio link used by a node to communicate with an upstream node of the node, and includes uplink and downlink transmission links. Uplink transmission on the backhaul link is also referred to as uplink transmission of the backhaul link, and downlink transmission on the backhaul link is also referred to as downlink transmission of the backhaul link. The nodes include but are not limited to the foregoing IAB node.

A beam may be understood as a spatial resource, and may be a transmit or receive precoding vector for directional energy transmission. In addition, the transmit or receive precoding vector can be identified by using index information. The directional energy transmission may mean that a signal that needs to be sent is precoded by using the precoding vector, the precoded signal has a specific spatial directivity, and there is a relatively good receive power for receiving the signal that is precoded by using the precoding vector, for example, the precoded signal meets a receive end demodulation signal-to-noise ratio. The directional energy transmission may also mean that receive powers are different for receiving, by using the precoding vector, same signals sent from different spatial locations. In an embodiment, a same communications device, for example, a terminal device or a network device, may have different precoding vectors, and different communications devices may also have different precoding vectors, that is, correspond to different beams.

In terms of a configuration or a capability of a communications device, one communications device may use one or more of a plurality of different precoding vectors at a same moment, that is, one or more beams may be formed at the same time. Beam information may be identified by using index information. In an embodiment, the index information may correspond to a resource identifier (ID) configured for a terminal device. For example, the index information may correspond to a configured ID, index, or resource of a channel state information-reference signal (CSI-RS), or may correspond to a configured ID or resource of an uplink sounding reference signal (SRS). Alternatively, in an embodiment, the index information may be index information that is explicitly or implicitly carried in a signal or channel carried by using a beam. For example, the index information includes but is not limited to index information that is used to indicate the beam by using a synchronization signal or a broadcast channel sent by using the beam. The resource may be at least one of the following: a time domain, a frequency domain, or a code domain (sequence).

It should be understood that the term "and/or" in this specification describes only an association relationship for describing associated objects and represents that three relationships may exist. For example, A and/or B may represent the following three cases: Only A exists, both A and B exist, and only B exists.

In addition, 5G NR supports a high frequency band and uses a massive antenna technology (e.g., Massive MIMO), so that energy of a signal can be transmitted in a specific direction in a centralized manner. In this way, an IAB device can simultaneously receive signals transmitted from a plurality of directions. The following describes some schematic diagrams of system composition in IAB space division transmission, as shown in FIG. 2 to FIG. 5.

Figure 2:
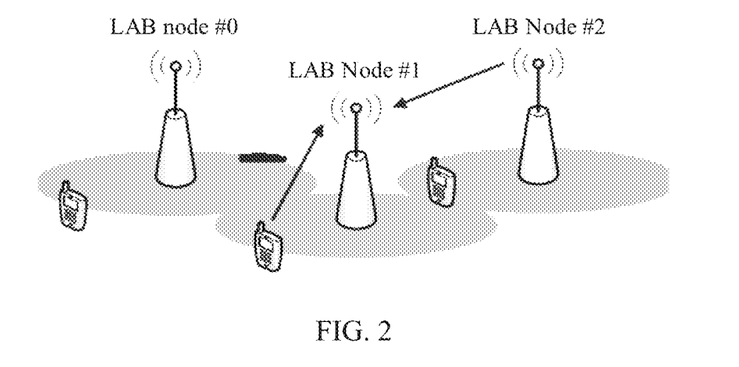
FIG. 2 to FIG. 5 are each an architectural diagram of another system according to an embodiment.
Figure 3:
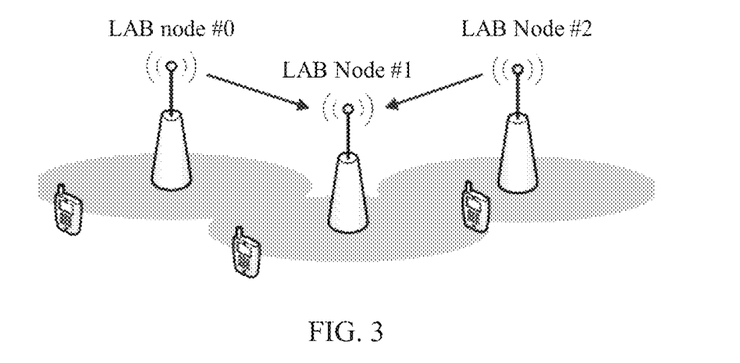
Figure 4:
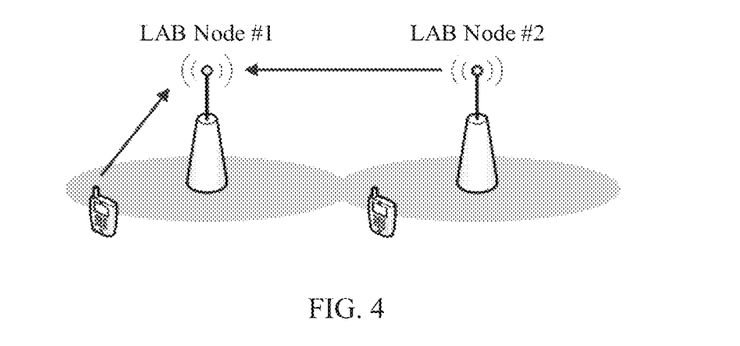
Figure 5:
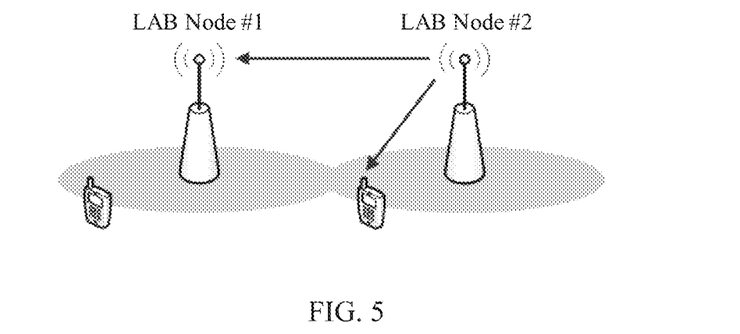

As shown in FIG. 2 to FIG. 5, an IAB system includes IAB devices, for example, an IAB node 0, an IAB node 1, and an IAB node 2, and a terminal device UE served by each IAB device. In FIG. 2, the IAB node 1 simultaneously receives an uplink signal from the UE and an uplink signal from the IAB node 2. In FIG. 3, the UE served by the IAB node 1 and the adjacent node, namely, the IAB node 2 simultaneously send uplink signals, and the IAB node 1 simultaneously receives the uplink signal from the UE and uplink signals from the IAB node 0 and the IAB node 2. In FIG. 4, the UE served by the IAB node 1 and the IAB node 2 simultaneously send uplink signals, and the IAB node 1 simultaneously receives the uplink signal from the UE and the uplink signal from the IAB node 2. In FIG. 5, the IAB node 2 sends a downlink signal to the UE and sends an uplink signal to the IAB node 1 at a same time point or within a same time period.

Figure 6:
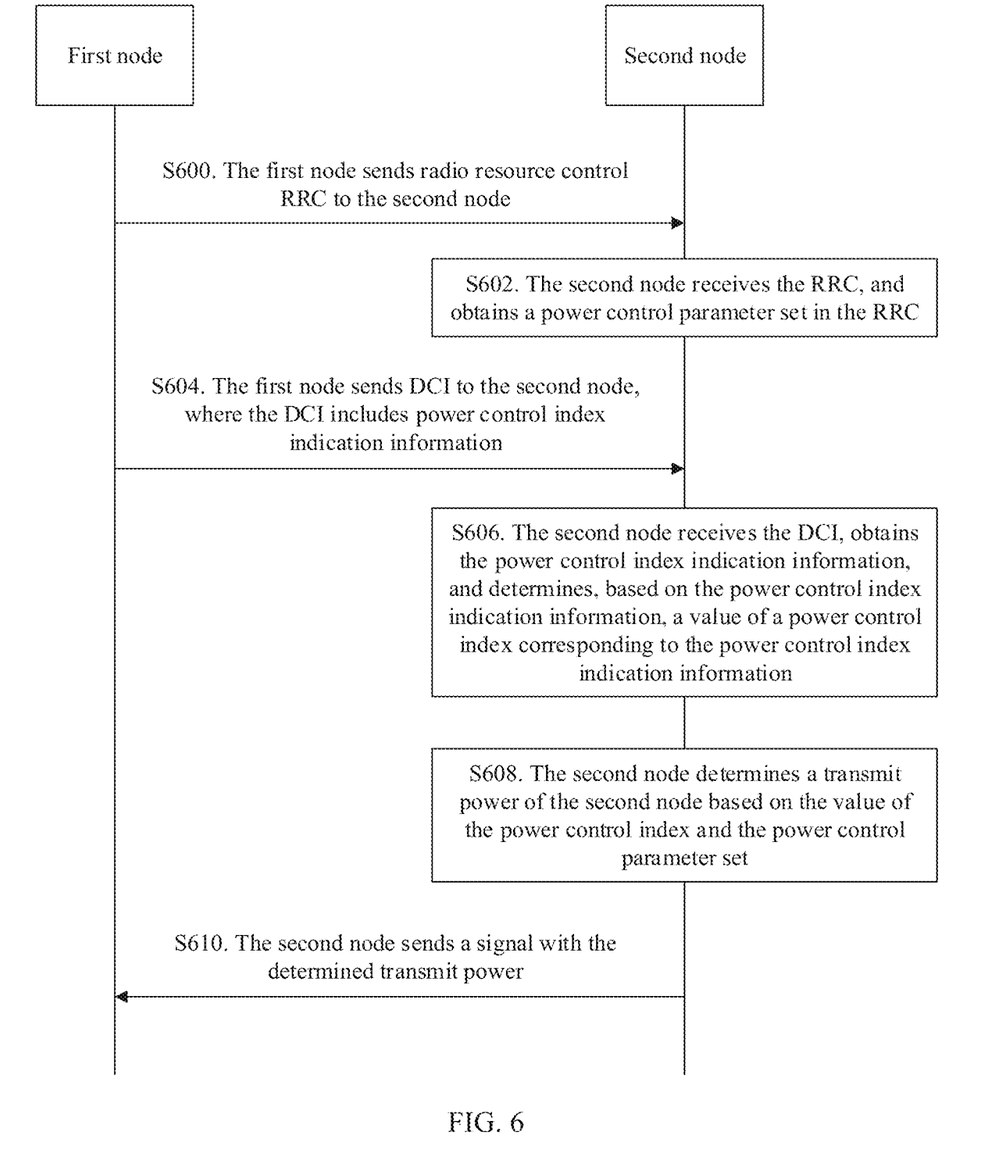
FIG. 6 is a schematic flowchart of a power control method according to an embodiment.

FIG. 6 is a flowchart of a power control method according to an embodiment. As shown in FIG. 6, the method in this embodiment includes the following steps.

That a relay node in IAB is an IAB node, and the architecture of the IAB system shown in FIG. 5 are used as an example to describe the power control method. For ease of description, the IAB node 2 is used as a first node, and an upstream node of the first node is referred to as a second node, for example, the IAB node 1. The first node and the second node each may be a base station, a relay node, a terminal with a relay function, or any device with a relay function. The IAB node 2 sends a downlink signal to the terminal device UE and sends an uplink signal to the IAB node 1 at a same time point or within a same time period.

S600. The first node sends radio resource control RRC to the second node, where the RRC includes a power control parameter set configured for the second node, the power control parameter set includes a power control index, and the power control index is determined based on a transmission mode and/or a transmission capability.

The power control parameter set is used to control a transmit power of a physical uplink shared channel (PUSCH) of the second node.

The power control parameter set includes a power control index. For example, the power control index may be a channel sounding reference signal resource index (SRI). The SRI is determined based on a transmission mode and/or a transmission capability. The transmission mode may be a space division multiplexing transmission mode, and the transmission capability may be a quantity of beams supported by the second node. Different beams correspond to different power control indexes, and different transmission modes correspond to different power control indexes. Based on different transmission modes and/or transmission capabilities, the power control index may have at least two values, for example, two or four values.

A channel sounding reference signal resource index-physical uplink shared channel-closed-loop index SRI-PUSCH-CloesdLoopIndex is used as an example, and different application scenarios in FIG. 4 and FIG. 5 and different beams supported by the second node are used as examples to describe values of the closed-loop index.

The systems in FIG. 4 and FIG. 5 are used as examples, and different transmission modes correspond to different power control indexes. The values of the closed-loop index may include i0 and i1, and the values may be indicated by using one bit. For example, a bit 0 is used to indicate i0, and a bit 1 is used to indicate i1.

i0 is used to indicate a power index value configured for the second node, namely, the IAB node 2, to send an uplink signal to the node 1 in such a space division multiplexing scenario as FIG. 4.

i1 is used to indicate a power index value configured for the second node, namely, the IAB node 2, to send an uplink signal to the node 1 in such a space division multiplexing scenario as FIG. 5.

In the different scenarios in FIG. 4 and FIG. 5, especially in FIG. 5, the second node serves as a base station to provide a service to the terminal device at a same time point or within a same time period, and serves as an access terminal to send an uplink signal to the first node. Therefore, for the second node, interference or impact of a link used by the second node serving as a base station to provide a service to the terminal device needs to be considered. Therefore, an uplink transmit power between the second node and the first node in FIG. 5 needs to be differentiated from a configured uplink transmit power of the second node in FIG. 4, and a different uplink transmit power needs to be configured. Different uplink transmit powers may be distinguished by using i0 and i1 in a power control parameter set, and are further indicated by using configured different power control parameter sets.

The system in FIG. 4 or FIG. 5 is used as an example. Different transmission modes correspond to different power control indexes. The second node, namely, the IAB node 2, may also serve as a base station to send an uplink signal to the first node, namely, the IAB node 1, by using one or more beams. The values of the closed-loop index may include i0, i1, i2, and i3. The values may be indicated by using two bits. For example, 00 is used to indicate i0, 01 is used to indicate i1, 10 is used to indicate i2, and 11 is used to indicate i3.

Based on FIG. 4, the second node may support two types of beams, for example, a beam 1 and a beam 2.

i0 is used to indicate a power index value that needs to be configured for the second node, namely, the IAB node 2, to send a signal to the node 1 by using the beam 1.

i1 is used to indicate a power index value that needs to be configured for the second node, namely, the IAB node 2, to send a signal to the node 1 by using the beam 2.

Based on FIG. 5, the second node may support two types of beams, for example, a beam 1 and a beam 2.

i2 is used to indicate a power index value that needs to be configured for the second node, namely, the IAB node 2, to send a signal to the node 1 by using the beam 1.

i3 is used to indicate a power index value that needs to be configured for the second node, namely, the IAB node 2, to send a signal to the node 1 by using the beam 2.

Because interference or impact of a link used by the second node serving as a base station to provide a service to the terminal device needs to be considered, different power index values corresponding to different beams need to be further considered. Different uplink transmit powers may be distinguished by using i0, i1, i2, and i3 in a power control set, and are further indicated by using configured different power control parameter sets.

Further, the power control parameter set further includes at least one of the following parameters representing power control:

1. an uplink power control identifier ID, for example, SRI-PUSCH-PowerControl ID;
2. an uplink reference signal path loss identifier ID, for example, PUSCH-PathlossReference RS-ID;
3. an uplink transmission reference power p0-NominalWithGrant, ranging from −202 dBm to 24 dBm, and being a nominal reference power for uplink transmission;
4. a power control parameter P_0, being an adjustment value of power control; and
5. alpha, being a path loss compensation factor, having a default value of 1, and ranging from 0 to 1. If alpha is set to 1, all path losses are compensated. If alpha is set to 0, no path loss is compensated at all. A path loss is multiplied by alpha to obtain a specific path loss compensation, that is, alpha*PathLoss.

All the foregoing values except p0-NominalWithGrant are included in P0-PUSCH-AlphaSet, and the foregoing power parameter set has an ID number.

The power control index is associated with the foregoing power control parameter, and different power parameter sets are provided for different transmission capabilities and different transmission modes of different nodes.

The parameters in the power control parameter set may be carried and sent by using one or more pieces of RRC signaling.

S602. The second node receives the RRC, and obtains the power control parameter set in the RRC.

For example, the second node receives the RRC, obtains the power control parameter set in the RRC, and establishes, based on a power control parameter and a power control index in the power control parameter set, an association relationship between the power control index and the power control parameter, for example:

```
SRI-PUSCH-PowerControl  ::=       SEQUENCE {
    sri-PUSCH-PowerControlId          SRI-PUSCH-PowerControlId,
    sri-PUSCH-PathlossReferenceRS-Id  PUSCH-PathlossReferenceRS-Id,
    sri-P0-PUSCH-AlphaSetId           P0-PUSCH-AlphaSetId,
    sri-PUSCH-ClosedLoopIndex         ENUMERATED { i0, i1, i2, i3 }
}
```

In an embodiment, the second node stores and configures a parameter in the power control parameter set of the RRC.

S604. The first node sends DCI to the second node, where the DCI includes power control index indication information, and the power control index indication information is used to: when the first node schedules the second node, indicate a value of a power control index that is for uplink transmission configured for the second node.

The power control index indication information may be represented by using bits. The systems in FIG. 4 and FIG. 5 are used as examples, and different transmission modes correspond to different power control indexes. The values of the closed-loop index may include i0 and i1, and the values may be indicated by using one bit. For example, a bit 0 is used to indicate i0, and a bit 1 is used to indicate i0. Alternatively, the system in FIG. 4 or FIG. 5 is used as an example. Different transmission modes correspond to different power control indexes. The second node, namely, the IAB node 2, may also serve as a base station to send an uplink signal to the first node, namely, the IAB node 1, by using one or more beams. The values of the closed-loop index may include i0, i1, i2, and i3. The values may be indicated by using two bits. For example, 00 is used to indicate i0, 01 is used to indicate i1, 11 is used to indicate i2, and 11 is used to indicate i3. It is not limited to use one bit or two bits to indicate the power control index, and other manners can be used.

S606. The second node receives the DCI, obtains the power control index indication information, and determines, based on the power control index indication information, the value of the power control index corresponding to the power control index indication information.

For example, the second node determines, based on the power control index indication information in the DCI, the value of the power control index corresponding to the power control index indication information. For example, the second node determines that the value of the power control index corresponding to the power control index indication information being 0 is i0.

S608. The second node determines a transmit power of the second node based on the value of the power control index and the power control parameter set.

The second node searches, based on a power index value, for example, i0, the power control parameter set for a matching power control parameter corresponding to i0, to obtain the power control parameter. The second node obtains the transmit power of the second node through calculation based on the obtained power control parameter by using a power control calculation formula.

The power control calculation formula may be:

$$P_{PUSCH,b,f,c}(i, j, q_d, l) = \min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

All parameters in power control parameter sets in the foregoing formula may be configured for the second node by using RRC signaling.

S610. The second node sends a signal with the determined transmit power.

According to the foregoing embodiment, when power control is considered to be performed on a node, a value of a power control index is determined based on a transmission mode and/or a transmission capability, so that more application scenarios can be met and more transmission modes can be supported, for example, the node supports at least two transmit beams, and power control parameters can be adjusted more flexibly and quickly in space division multiplexing, non-space division multiplexing, and other scenarios.

Figure 7:
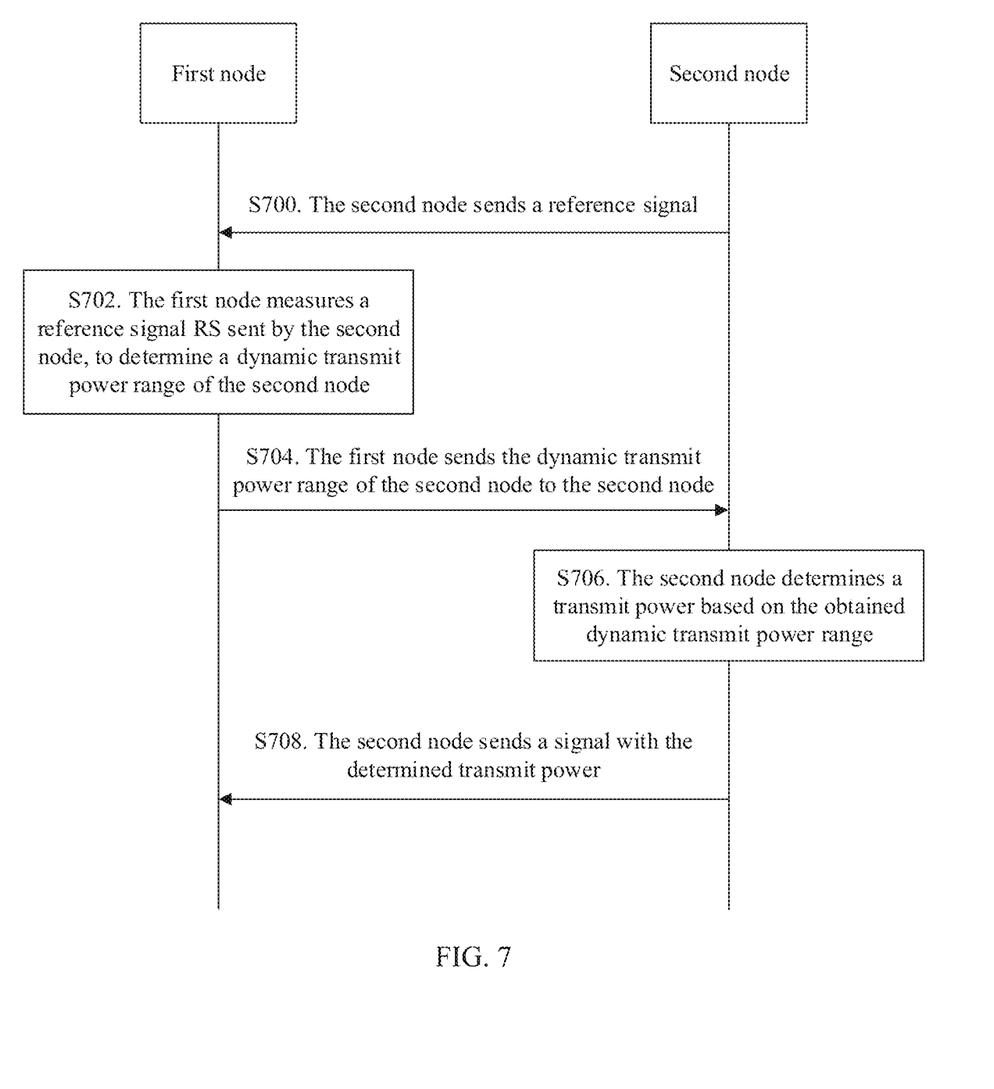
FIG. 7 is a schematic flowchart of another power control method according to an embodiment.

The embodiments of the present disclosure further provide another embodiment, as shown in FIG. 7.

When the relay node, for example, the second node, provides a service to the terminal device, the first node needs to consider an access power difference of the backhaul link when scheduling the second node. Therefore, an embodiment of the present disclosure further provides a procedure of another power control method. As shown in FIG. 7, the method includes the following steps.

A networking architecture diagram of the IAB in FIG. 5 is used as an example for description, but the embodiment is not limited to FIG. 5, and may be used in various networking architecture diagrams of FIG. 1 to FIG. 5.

S700. The second node sends a reference signal.

The reference signal includes a synchronization signal SSB (Synchronization Signal/physical broadcast channel Block), a channel state information-reference signal CSI-RS, a demodulation reference signal DMRS, a tracking reference signal TRS, a phase tracking reference signal PTRS, a sounding reference signal SRS, or another reference signal RS.

The reference signal sent by the second node may include a signal from the second node to the first node, or a signal from the second node to the terminal device UE. Herein, a downlink signal from the second node to the terminal device UE is mainly used as an example.

S702. The first node measures a reference signal (RS) sent by the second node, to determine transmit power dynamic range of the second node.

The transmit power of the second node is power with which the second node sends a signal to the UE or to another node on an access link. The transmit power is a downlink transmit power of the second node, for example, a downlink transmit power from the second node to the UE or a downlink transmit power from the second node to a next node in FIG. 5.

For example, S702 may include:

First, the first node measures the reference signal to obtain a measurement result, where the measurement result is used to represent interference strength of the reference signal.

Second, the first node determines transmit power dynamic range of the second node based on the measurement result.

The measurement result includes at least one of the following:

a reference signal received power (RSRP), reference signal received quality (RSRQ), a received signal strength indicator (RSSI), or a signal interference level (SINR).

Transmit power dynamic range may be an adjustment value of the transmit power of the second node, for example, ±X dB or ±X dBm; or may be an upper limit of an uplink transmit power, for example, X dB or X dBm, indicating that the uplink transmit power cannot be greater than the upper limit, for example, the transmit power cannot exceed 20 dB; or may be a range, for example, 10 dB to 20 dB.

Power dynamic range includes at least one of the following: power spectral density (PSD) dynamic range, with a unit of dBm/Hz, and or energy per resource element (EPRE) dynamic range, with a unit of dBm.

In an embodiment, the power range may alternatively be a specific value, for example, 20 dB.

For example, when the first node schedules, in a downlink slot of the second node, the second node to send signaling or data, the first node may measure the reference signal of the second node, for example, a synchronization signal SSB or a channel state information-reference signal CSI-RS, to obtain PSD dynamic range or EPRE dynamic range, for example, ±10 dBm, a range of {−10 dB, . . . , +10 dB}, or 20 dB.

S704. The first node sends transmit power dynamic range of the second node to the second node.

Further, the first node may report or feed back by using downlink control information (DCI), a media access control control element (MAC CE), or RRC signaling.

S706. The second node determines a transmit power based on obtained transmit power dynamic range.

The second node determines the transmit power based on transmit power dynamic range and a preconfigured transmit power of the second node.

In an embodiment, steps S700 to S706 may be replaced with the following procedure:

First, a donor gNodeB (IAB donor) or the first node configures an EPRE/PSD reference value, so that when the second node needs to send data to the first node through a backhaul link through space division multiplexing, an EPRE/PSD reference value of the backhaul link is equal to an EPRE/PSD reference value of an access link.

Second, each time space division multiplexing transmission is activated, the first node indicates power dynamic range to the second node, for example, a power reference EPRE/PSD power difference.

Power dynamic range may be notified to the second node each time of scheduling by using DCI, or may be indicated to the second node by using a MAC CE.

S708. The second node sends a signal with the determined transmit power.

In the solution of this embodiment, a relay node performs measurement, then feeds back uplink power dynamic range, and determines an uplink transmit power, so that when data sent by the relay node through space division is implemented, the transmit power can be properly controlled, thereby reducing interference impact on another link.

The present disclosure further provides another embodiment. Powers of a backhaul link and an access link of a relay node may be calculated by combining the power control method in the embodiment corresponding to FIG. 6 and the power control method in the embodiment corresponding to FIG. 7.

For example, FIG. 5 is used as an example. A transmit power between the second node serving as a terminal device and the first node is calculated by using the method procedure in FIG. 6, and a transmit power of an access link through which the second node serving as a base station provides a service to the terminal device is calculated by using the method corresponding to FIG. 7. Certainly, the powers of the backhaul link and the access link of the second node in FIG. 5 may alternatively be calculated separately by using the method procedure provided in the embodiment corresponding to FIG. 6. Alternatively, the transmit powers of the backhaul link and the access link of the second node in FIG. 5 may be calculated separately by using the method provided in the embodiment corresponding to FIG. 7. Alternatively, the transmit power of the backhaul link of the second node may be calculated by using the method corresponding to FIG. 7, and the transmit power of the access link may be calculated by using the method procedure provided in the embodiment corresponding to FIG. 6. For details, refer to the descriptions of the foregoing specific embodiments. Details are not described herein again.

The foregoing describes in detail the power control methods according to the embodiments with reference to FIG. 1 to FIG. 7. The following describes a power control apparatus according to the embodiments of this application with reference to figures. It should be understood that the technical features described in the method embodiments are also applicable to the following apparatus embodiments.

Figure 8:
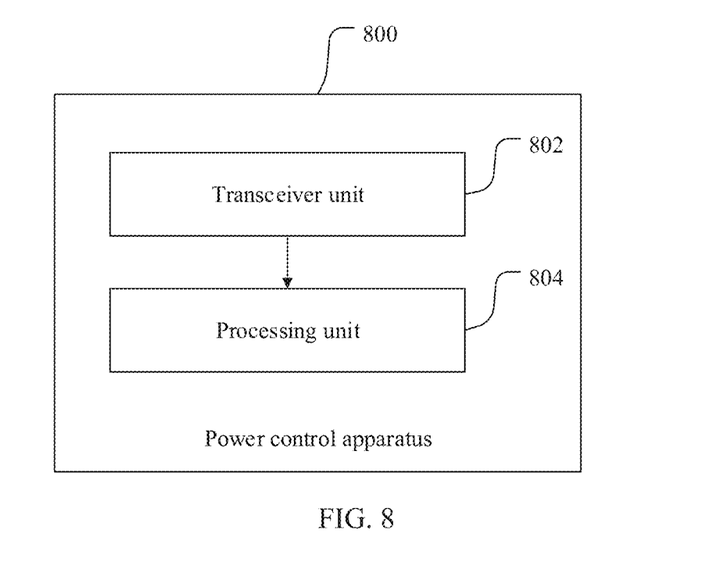
FIG. 8 is a schematic block diagram of a power control apparatus according to an embodiment.

FIG. 8 is a schematic block diagram of a power control apparatus according to an embodiment. The apparatus is configured to perform the method performed by the second node in the foregoing method embodiments. In an embodiment, a specific form of the apparatus may be a relay node or a chip in the relay node, or may be a terminal device or a chip in the terminal device. This is not limited in this embodiment of this application.

The apparatus includes:

a transceiver unit 802 and a processing unit 804.

The transceiver 802 is configured to receive radio resource control RRC, where the RRC includes a power control parameter set of the power control apparatus, the power control parameter set includes a power control index, and the power control index is determined based on a transmission mode and/or a transmission capability of the power control apparatus; and receive downlink control information DCI, where the DCI includes power control index indication information, and the power control index indication information is used to indicate a configured value of a power control index for uplink transmission.

The processing unit 804 is configured to determine a transmit power based on the power control index indication information and the power control parameter set.

The power control apparatus is configured to perform the power control method shown in FIG. 6. A related technical feature has been described in detail above with reference to the method 600 shown in FIG. 6, and therefore details are not described herein again.

Figure 9:
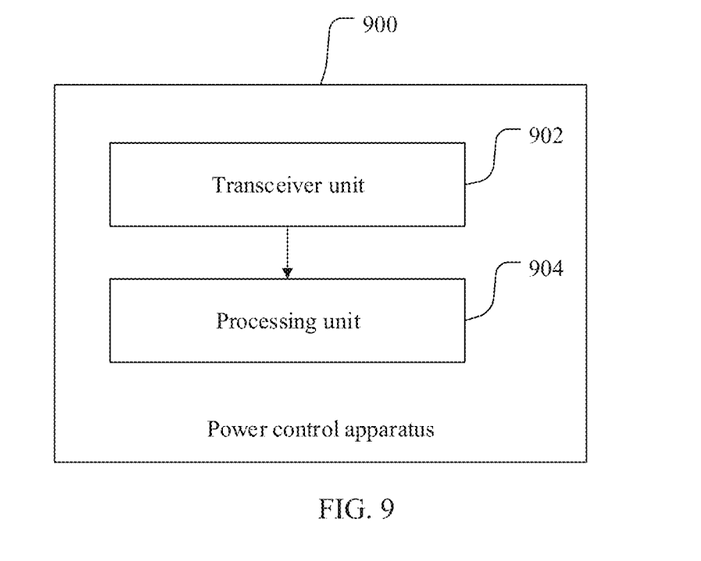
FIG. 9 is a schematic block diagram of another power control apparatus according to an embodiment.

FIG. 9 is a schematic diagram of a logical structure of another power control apparatus according to an embodiment. In an embodiment, the power control apparatus may be a network device, or may be a relay device, and the relay device may be a base station. The network device includes a transceiver unit 902 and a processing unit 904. FIG. 2 to FIG. 5 are used as an example, and the network device is a first node.

The transceiver unit 902 is configured to send radio resource control RRC, where the RRC includes a power control parameter set of the power control apparatus, the power control parameter set includes a power control index, and the power control index is determined based on a transmission mode and/or a transmission capability of the power control apparatus; and receive downlink control information DCI, where the DCI includes power control index indication information, and the power control index indication information is used to indicate a configured value of a power control index for uplink transmission.

The processing unit 904 is configured to determine the power control parameter set, where the power control parameter set includes a power control index, and the power control index is determined based on a transmission mode and/or a transmission capability of a second node.

The network device is configured to perform the power control method shown in FIG. 7. A related technical feature has been described in detail above with reference to the method shown in FIG. 7, and therefore details are not described herein again.

Figure 10:
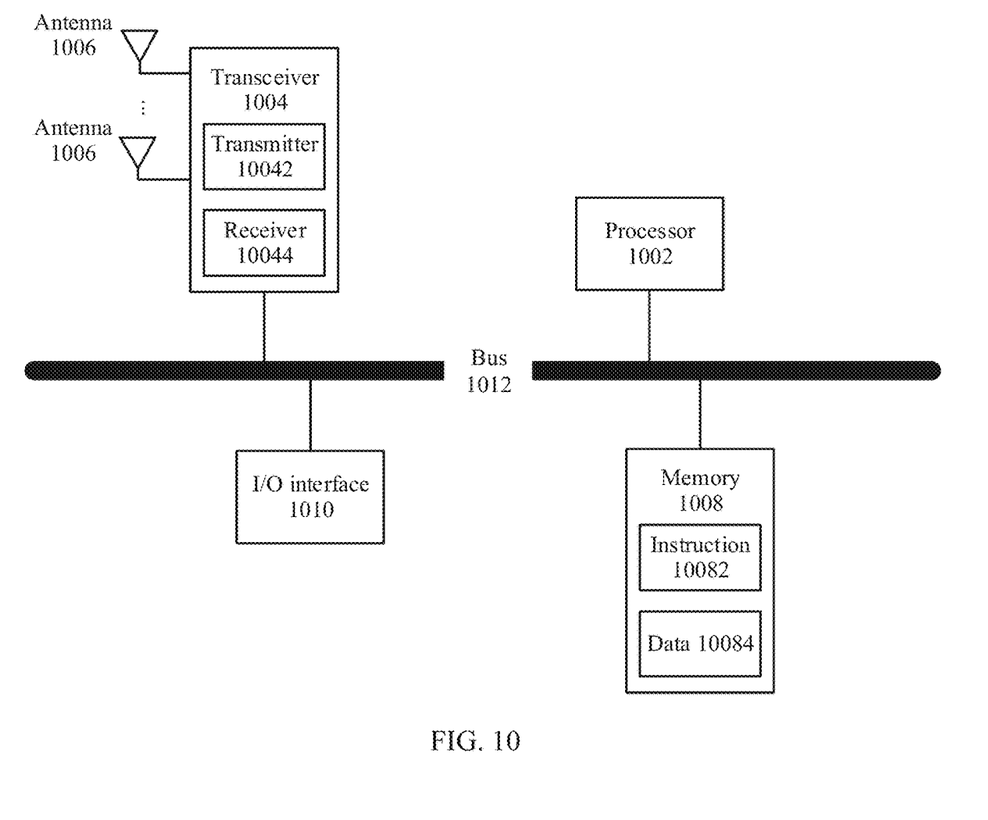
FIG. 10 is a schematic diagram of a hardware structure of a network device according to an embodiment.

FIG. 10 is a schematic diagram of a hardware structure of a network device according to an embodiment. As shown in FIG. 10, the network device includes a processor 1002, a transceiver 1004, a plurality of antennas 1006, a memory 1008, an I/O (input/output) interface 1010, and a bus 1012. The transceiver 1004 further includes a transmitter 10042 and a receiver 10044, and the memory 1008 is further configured to store an instruction 10082 and data 10084. In addition, the processor 1002, the transceiver 1004, the memory 1008, and the I/O interface 1010 are communicatively connected to each other by using the bus 1012, and the plurality of antennas 1006 are connected to the transceiver 1004.

The processor 1002 may be a general-purpose processor, for example, but not limited to, a central processing unit (CPU), or may be a dedicated processor, for example, but not limited to, a digital signal processor (DSP), an application-specific integrated circuit (ASIC), or a field programmable gate array (FPGA). In addition, the processor 1002 may alternatively be a combination of a plurality of processors. Particularly, in the technical solutions provided in this embodiment of the present disclosure, the processor 1002 may be configured to perform, for example, operations performed by the processing units in FIG. 8 and FIG. 9. The processor 1002 may be a processor specially designed to perform the foregoing steps and/or operations, or may be a processor that performs the foregoing steps and/or operations by reading and executing the instruction 10082 stored in the memory 1008. The processor 1002 may need to use the data 7084 in a process of performing the foregoing steps and/or operations.

The transceiver 1004 includes a transmitter 10042 and a receiver 10044. The transmitter 10042 is configured to send a signal by using at least one of the plurality of antennas 1006. The receiver 10044 is configured to receive a signal by using at least one of the plurality of antennas 1006. Particularly, in the technical solution provided in this embodiment, the transmitter 10042 may be configured to perform, by using at least one of the plurality of antennas 1006, for example, operations performed by the transceiver units in FIG. 8 and FIG. 9.

The memory 1008 may be various types of storage mediums, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 1008 is configured to store the instruction 10082 and the data 10084. The processor 1002 may perform the foregoing steps and/or operations by reading and executing the instruction 10082 stored in the memory 1008. The processor 1002 may need to use the data 7084 in a process of performing the foregoing operations and/or steps.

The I/O interface 1010 is configured to receive an instruction and/or data from a peripheral device, and output an instruction and/or data to the peripheral device.

It should be noted that, in an embodiment, the network device may further include other hardware components, which are not listed one by one in this specification.

The diagram of the hardware structure of the network device may be a diagram of a hardware structure of the network device in FIG. 8 or FIG. 9.

The technical solutions provided in this embodiment of the present disclosure may be implemented in a manner of a processor plus a transceiver. The processor is configured to perform various processing operations, for example, but not limited to, operations such as generating, determining, judging, searching, extracting, obtaining, reading, and receiving input to-be-processed data and outputting processed data. The transceiver is configured to perform operations such as transmitting and receiving. In an embodiment, the processor may be implemented in the following manners:

In a first manner, the processor is a dedicated processor. In this case, the processor may further include an interface circuit and a processing circuit. The interface circuit is configured to receive data that needs to be processed by the processing circuit, and output a processing result of the processing circuit. The processing circuit is configured to perform the foregoing various processing operations.

In a second manner, the processor is implemented by using an architecture of a general-purpose processor plus a memory. The general-purpose processor is configured to execute processing instructions stored in the memory, and the processing instructions are used to instruct the general-purpose processor to perform the foregoing various processing operations. It is easy to understand that processing performed by the general-purpose processor depends on the processing instructions stored in the memory, and the general-purpose processor may be controlled, by modifying the processing instructions in the memory, to output different processing results.

Further, in the second manner, the general-purpose processor and the memory may be integrated on a same chip. For example, both the general-purpose processor and the memory may be integrated on a processing chip. In addition, the general-purpose processor and the memory may also be disposed on different chips. For example, the general-purpose processor is disposed on a processing chip, and the memory is disposed on a storage chip.

The technical solutions provided in the embodiments of the present disclosure may be further implemented in a manner of a computer-readable storage medium. The computer-readable storage medium stores a processing instruction for implementing the technical solutions in the embodiments of the present disclosure, to be read by a general-purpose processing device to complete the technical solutions provided in the embodiments of the present disclosure. The general-purpose processing device should be understood as a processing device including necessary hardware components such as a processor and a transceiver. Operations of these hardware components depend on the processing instruction stored in the computer-readable storage medium.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

To sum up, the foregoing descriptions are merely embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A power control apparatus, comprising:
a transceiver, configured to: receive radio resource control (RRC) comprising a power control parameter set of the power control apparatus, the power control parameter set comprises a power control index determined based on a transmission mode or a transmission capability of the power control apparatus; and receive downlink control information (DCI) comprising power control index indication information that indicates a configured value of a power control index for uplink transmission; and
a processor, configured to determine a transmit power based on the power control index indication information and the power control parameter set;
wherein the transmission mode is a space division multiplexing transmission mode, and the transmission capability is a quantity of beams supported by the power control apparatus.

2. The power control apparatus according to claim 1, wherein the transceiver is further configured to send a signal at the determined transmit power.

3. The power control apparatus according to claim 1, wherein the power control parameter set further comprises at least one of the following power control parameters:
an uplink power control identifier, an uplink reference signal path loss identifier, an uplink transmission reference power, a power control parameter, or a path loss compensation factor.

4. The power control apparatus according to claim 3, wherein the power control index is associated with the power control parameter.

5. A power control apparatus, comprising:
a transceiver, configured to: receive radio resource control (RRC) comprising a power control parameter set of the power control apparatus, the power control parameter set comprises a power control index determined based on a transmission mode or a transmission capability of the power control apparatus; and receive downlink control information (DCI) comprising power control index indication information that indicates a configured value of a power control index for uplink transmission; and
a processor, configured to determine a transmit power based on the power control index indication information and the power control parameter set;
wherein different transmission modes of the power control apparatus correspond to different power control indexes, and different transmission capabilities of the power control apparatus correspond to different power control indexes.

6. The power control apparatus according to claim 5, wherein the transceiver is further configured to send a signal at the determined transmit power.

7. The power control apparatus according to claim 5, wherein the power control parameter set further comprises at least one of the following power control parameters:
an uplink power control identifier, an uplink reference signal path loss identifier, an uplink transmission reference power, a power control parameter, or a path loss compensation factor.

8. The power control apparatus according to claim 7, wherein the power control index is associated with the power control parameter.

9. A power control apparatus, comprising:
a transceiver, configured to: receive radio resource control (RRC) comprising a power control parameter set of the power control apparatus, the power control parameter set comprises a power control index determined based on a transmission mode or a transmission capability of the power control apparatus; and receive downlink control information (DCI) comprising power control index indication information that indicates a configured value of a power control index for uplink transmission; and
a processor, configured to determine a transmit power based on the power control index indication information and the power control parameter set obtain, based on the power control index indication information, the value of the power control index indicated by the power control index indication information; obtain, based on the obtained value of the power control index and the power control parameter set, a power control parameter corresponding to the power control index; and determine the transmit power based on the power control parameter and a power control calculation formula.

10. The power control apparatus according to claim 9, wherein the transceiver is further configured to send a signal at the determined transmit power.

11. The power control apparatus according to claim 9, wherein the power control parameter set further comprises at least one of the following power control parameters:
an uplink power control identifier, an uplink reference signal path loss identifier, an uplink transmission reference power, a power control parameter, or a path loss compensation factor.

12. The power control apparatus according to claim 11, wherein the power control index is associated with the power control parameter.

* * * * *